United States Patent

[11] 3,572,556

| [72] | Inventor | Peter Pogacar |
| | | Philosophenweg La, Heidelberg, Germany |
| [21] | Appl. No. | 810,091 |
| [22] | Filed | Mar. 25, 1969 |
| [45] | Patented | Mar. 30, 1971 |
| [32] | Priority | Mar. 28, 1968 |
| [33] | | Germany |
| [31] | | P31166 |

[54] APPARATUS FOR METERING OF LIQUIDS
10 Claims, 6 Drawing Figs.

[52] U.S. Cl.................................................. 222/400.8,
128/218, 222/309, 222/386
[51] Int. Cl...................................................... B67d 5/42,
A61m 5/00
[50] Field of Search........................................... 73/422
(G.C.), 425.6; 222/386, 389, 400.8, 401, 335,
373, 399, 491; 128/218 (C)

[56] References Cited
UNITED STATES PATENTS

| 1,071,890 | 9/1913 | Desmond ..................... | 222/401 |
| 1,382,397 | 6/1921 | Whitehouse................. | 222/389(UX) |
| 1,930,929 | 10/1933 | Eisenberg..................... | 128/218 |
| 3,101,084 | 8/1963 | Hamilton...................... | 128/218(C) |
| 3,203,455 | 8/1965 | Horabin ........................ | 128/318(C) |
| 3,272,393 | 9/1966 | Roeser .......................... | 222/389X |
| 3,343,539 | 9/1967 | Moorhouse .................. | 128/234 |

Primary Examiner—Davis T. Moorhead
Attorney—Michael S. Striker

ABSTRACT: A method of and an apparatus for metering of liquids. A canula has a preferably capillary passage whose volume, when the passage is completely filled, corresponds to a precisely predetermined quantity of liquid. In accordance with the invention, the passage is completely filled and thereupon the liquid is completely ejected therefrom so that the quantity of ejected liquid is a precisely metered quantity.

Patented March 30, 1971  3,572,556
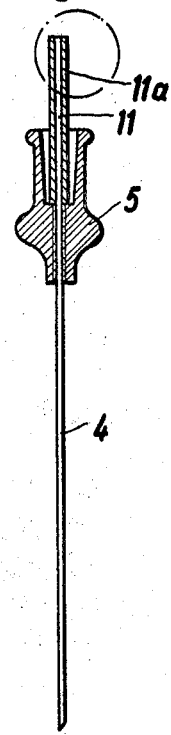
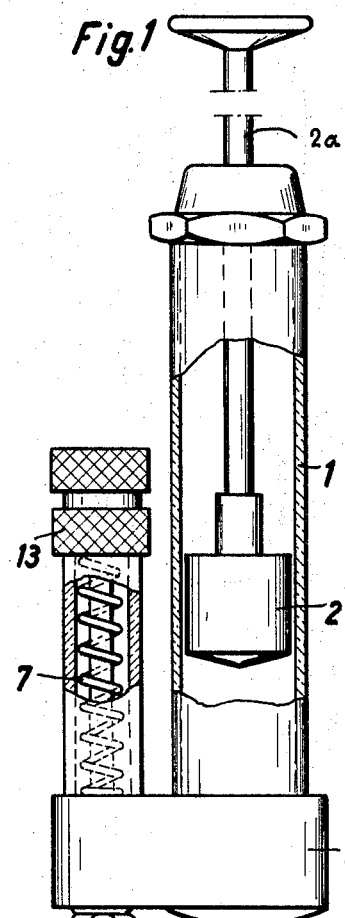
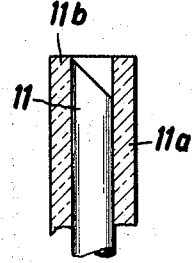
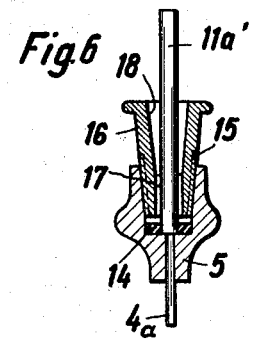
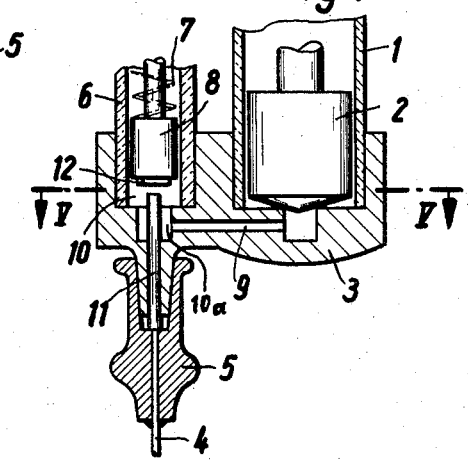
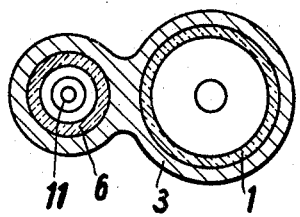
Inventor:
PETER POGACAR
By Michael S. Striker
Attorney 3,572,556

APPARATUS FOR METERING OF LIQUIDS

BACKGROUND OF THE INVENTION

The present invention relates to the metering of liquids in general, and more particularly to the precision metering of small quantities of liquids. Still more particularly the invention relates to a method for metering of liquids and to an apparatus for carrying out the method.

In many circumstances, it is necessary to precisely meter very small quantities of liquid. This includes circumstances where a liquid is to be injected into another medium for treating purposes or for analytical purposes, as when such liquid is to be injected into the blood stream of a living organism or into apparatus used for chemical or physics purposes, particularly for analytical purposes.

This presents no problem as long as the quantities of liquid to be injected amount to approximately one-half cubic centimeter or more. Under these circumstances, a conventional injection syringe is adequate and in many cases the particular liquid to be injected is already available in an ampul containing the requisite predetermined quantity. However, there are circumstances where much smaller quantities of liquid must be injected which are on the order of only a few cubic millimeters. This is the case both in the treatment of small life forms and in conjunction with analytical apparatus. In such applications it is extremely difficult to assure that only a precisely metered quantity of the liquid is injected, and it will be evident that if the quantity is slightly larger or slightly smaller than the predetermined amount required, the treatment of the life form involved will be endangered or, where analytical procedures are concerned, the results will be incorrect.

For these purposes it is known in the art to use so-called microsyringes which in the main consist of a strong walled glass tube with a longitudinal bore of extremely small diameter and which glass wall is provided with quantity indicia, and a piston slidable in the bore, with a needle-shaped canula being connected to the outlet end of the bore. By way of example, it may be pointed out that where such microsyringes are used in gas chromatographic experiments, the chromatographic apparatus is provided with a rubber membrane which is pierced with the canula, whereupon the contents of the bore are ejected through the canula and injected into the apparatus. The problem with this type of microsyringe, and this is true not only of the just-mentioned exemplary use but generally in the use of this type of syringe, is the fact that on the one hand it is very expensive to manufacture syringes of this type and that—even more importantly—it is very difficult and requires extreme concentration to provide precise metering of the quantity of liquid which is being injected. This is true even if the piston has a diameter of only 1 millimeter or approaching 1 millimeter. Furthermore, in many instances, it is unavoidable that when the bore is first charged with the liquid by retraction of the piston, small air bubbles will remain in the canula which on ejection will reduce the quantity of liquid which is being ejected.

An additional disadvantage, which is particularly troublesome in gas chromatographic experiments, is the fact that these microsyringes are extremely sensitive and fragile, and that they are therefore very difficult to clean especially in view of their extremely small diameter bore and the length of the latter, with the final result being that even under the best of circumstances there is no guarantee that precise metering is reproducible in each case of use. As mentioned before, this is particularly disadvantageous in gas chromatographic experiments.

SUMMARY OF THE INVENTION

It is, accordingly, an object of the present invention to overcome these disadvantages.

More particularly, it is an object of the present invention to provide a method of precisely metering small reproducible quantities of liquids.

An additional object of the present invention is to provide an apparatus for carrying out the method.

A concomitant object of the invention is to provide such an apparatus which is much simpler than has been known heretofore and which is much more accurate.

A concomitant object of the invention is to provide such an apparatus which can be more readily cleaned and is less fragile and sensitive than the constructions known heretofore for the purposes at hand.

Still another object of the invention is to provide such an apparatus which is less expensive to manufacture than what has been known heretofore for this purpose.

In pursuance of the above objects, and others which will become apparent hereafter, one feature of my invention resides in the provision of an apparatus for the precision metering of liquids, which apparatus comprises a tubular member provided with an interior passage having opposite open ends and being of a predetermined volume. The interior passage contains a predetermined quantity of liquid when it is completely filled. Ejecting means cooperates with the tubular member and serves for ejecting the entire predetermined quantity of liquid from the passage thereof.

The tubular member will ordinarily be in form of a canula and the entire bore of the canula may constitute the interior passage. However, it is also possible to make the canula of two parts in which case the bore will be in two sections only one of which may be the aforementioned interior passage whose predetermined volume determines the quantity of liquid contained when the passage is completely filled.

It is advantageous to construct the interior passage as a capillary passage which, when one open end thereof is introduced into a body of the liquid which is to be metered, will draw the liquid in until the passage is completely filled by capillary action.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic side elevational view of the apparatus embodying my invention, with parts being broken away for clarity;

FIG. 2 illustrates one embodiment of a canula according to the present invention for use with the apparatus of FIG. 1;

FIG. 3 is a fragmentary longitudinally sectioned detailed view of the portion which is outlined in FIG. 2 by the broken-line circle;

FIG. 4 is a fragmentary longitudinal section through the lower portion of the apparatus shown in FIG. 1;

FIG. 5 is a section taken on the line V-V of FIG. 4; and

FIG. 6 is a fragmentary longitudinal section illustrating a canula according to another embodiment of the invention.

DESCRIPTION OF THE PREFERRED EMBODIMENTS

Discussing now the drawing in detail, and firstly the entire apparatus as illustrated in FIG. 1 thereof, it will be seen that I provide a canula 4 including a coupling element 5. The canula will be described in more detail subsequently, but is should be understood that it will be filled with the liquid to be metered and that in filled condition it is coupled via the coupling element 5 with the head 3 of the ejecting means of my apparatus, here illustrated as a hand pump. This latter comprises a cylinder 1 in which a piston 2 is movable between a retracted position and an advanced pressurized position via a plunger portion 2a which may be gripped by the hand of an operator. In effect this construction is analogous to conventional injection syringes.

The canula 4 is illustrated in more detail in FIGS. 2 and 3 and it will be seen that it is needle shaped and provided in conventional manner with a longitudinal bore (not identified with reference numeral). In the embodiments of FIGS. 2 and 3, the canula is of two-piece construction in that it comprises a rear extension in form of a tubular member 11 which extends rearwardly from the canula 4 beyond the coupling member 5 and whose interior communicates with the bore of the canula 4. In this embodiment the tubular extension 11 is surrounded by a tubular member 11a consisting of glass or another capillary material. As shown in FIG. 3, the rear end portion of the tubular member 11 is beveled in the manner illustrated whereas the rear end face 11b of the member 11a extends in a plane normal to the axis of the canula 4 and the members 11 and 11a. In this embodiment the bore in the canula 4 as well as in the tubular extension 11 together have the desired predetermined volume; in other words, when the canula 4 is entirely filled, and when further the bore in the tubular extension 11 is also entirely filled, the quantity of liquid contained therein is that quantity which it is desired to eject, or rather to inject either into a life form or into a testing apparatus. Returning to FIG. 1 and further considering FIGS. 4 and 5, it will be seen that the head 3 is provided with a recess 10 in which there is received a tubular sleeve 6 in seal-type relationship. Located in the sleeve 6 is a plunger 8 which is biased by a suitable biasing means, such as the helical spring 7, towards the opening 10a of the recess 10. When the canula is connected with the head 3 in the manner illustrated in FIG. 4—the cooperation between the coupling arrangement on the head 3 and the coupling member 5 being conventional in the art—the extension 11 which projects rearwardly beyond the coupling member 5 extends through the opening 10a into the recess 10. The spring 7 normally urges the sealing portion 12 of the plunger 8 into sealing engagement with the end face 11b (compare FIG. 3) of the member 11a thereby closing the interior of the canula against communication with the recess 10.

As further evident from FIG. 4, a conduit 9 communicates with the interior of the cylinder 11 forwardly of the operating position of the piston 2 and similarly with the recess 10 also forwardly of the plunger 8. The pretension imparted to the spring 7 may be changed if desired, for instance by the knurled cap 13 which in known manner is connected with the sleeve 6 and serves to axially compress the spring 7 to the desired extent, depending upon how far the cap 13 is screwed down onto the sleeve 6. The plunger 8 in conjunction with the spring 7 constitutes a valve which is normally closed. In FIG. 4 the valve is shown in open position.

The canula 4 with its extension 11 may be filled by capillary action, which latter may be enhanced if the canula 4 is configurated as a hollow metallic needle—by provision of the tubular member 11a of glass or another capillary material.

In operation of my apparatus, the canula 4 with its extension 11 and the tubular member 11a when the same is provided, is separated from the remainder of the apparatus by disengaging the coupling member 5 from the head 3. The canula now has its entire interior filled with the liquid, either by capillary action or in another suitable manner, for instance by introducing the open front end of the canula 4 into the liquid and connecting to the member 11 a small flexible conduit with suction being exerted through this conduit until the canula and a portion of the conduit is filled with liquid whereupon the conduit is then removed with the canula remaining filled to capacity. The plunger 2a is withdrawn to move the piston 2 to suction position in the cylinder 1. Now the canula is connected to the head 3 in the manner shown in FIG. 4 with the result that the end face 11b deflects the plunger 8 somewhat rearwardly against the action of the spring 7 and remains in sealtight engagement with the sealing portion 12 of the plunger 8.

If, now, the contents in the interior of the canula 4 are to be injected into a gas chromatographic apparatus wherein the gas is under a pressure of 3 to 4 atmospheres, the pressure exerted by the spring 7 is so selected that the plunger 8 will not lift off the end face 11b except when subject to a pressure which is higher than the maximum pressure prevailing in the gas chromatographic apparatus. Now the front end of the canula may be used to pierce in conventional manner the rubber membrane which is provided in such apparatus for this purpose; because the plunger 8 remains in sealing contact with the end face 11b, no gas can escape from the apparatus through the canula into the recess 10. Similarly, none of the liquid in the canula can be dislodged, under these circumstances.

To eject the liquid from the interior of the canula into the apparatus—or into the body of a life form if this is what is required—the plunger 2a is depressed, the piston 2 moves to the position shown in FIG. 4 and the air pressure thus created is communicated through the conduit 9 to the recess 10 downwardly of the plunger 8, and because this air pressure is greater than the pressure exerted by the spring 7, the plunger 8 is lifted off the end face 11b to the position shown in FIG. 4 with the result that the pressurized air passes from the conduit 9 and the recess 10 through the interior of the canula, ejecting the entire liquid contained therein.

Not only does this result in the ejection of precisely metered quantities of liquid in each case, but these quantities can be reproduced in every case of use and they will be ejected from the canula and injected into the apparatus or life form, as the case may be, with a pressure which is always the same in each case of use.

It will be appreciated that if subsequently a different liquid is to be similarly ejected, it is only necessary to change the canula without requiring any cleaning of the actual ejecting means and/or the valve. The reason for this is that no liquid ever enters into these components. With respect to the latter, it should be emphasized that despite the provision of the valve the manufacture of these components is rather inexpensive because by themselves they do not serve any metering purposes and must therefore not be manufactured to precise tolerances. The manufacture of precisely made canulas, however, is possible at very low expense by mass-production methods.

The embodiment in FIG. 6 differs from the embodiment of the canula as shown in FIGS. 2 and 3 in that the main body portion of the canula 4a in FIG. 6—or rather the bore provided in the main body portion—need not itself be the interior passage whose predetermined volume is determinative of the metered quantity of liquid. Like elements are identified with reference numeral 6 in FIG. 6 with like reference numerals in the preceding FIGS. It will be seen, however, that in FIG. 6 the tubular extension 11a'—or rather the bore therein—is determinative of the predetermined quantity of liquid to be ejected. The tubular extension 11a' may, according to the embodiment of FIG. 6, be releasably connected with the canula 4a, or rather with the coupling member 5 and via the same with the canula 4a. It will be seen that an elastic sealing ring 14 is provided in the coupling member 5 and that the latter is provided with an internal screw thread 15 into which an externally screw-threaded member 16 is threaded. The member 16 has a longitudinal bore 17 whose inner diameter is somewhat larger than the outer diameter of the extension 11a'. The bore 18 conically diverges in direction towards the rear or outer end of the member 16 for coupling with the head 3 in the manner shown in FIG. 4. The extension 11a' is provided with a capillary bore and will be filled to its capacity simply by inserting one of its open ends into a body of the liquid which is to be metered. Thereupon it is introduced through the bore 18 of the member 16—which is only loosely threaded into the member 5 at this time—and into the center aperture of the annular sealing member 14. The member 16 is now tightly threaded into the member 5 and compresses the sealing ring 14 which therefore provides a sealtight closure at the point of communication between the bore and the canula 4a and the bore in the tubular extension 11a'. When this construction is connected with the head 3 of the ejecting means as illustrated in FIG. 4, the metered quantity of liquid which is ejected is that quantity contained in extension 11a'.

Evidently, various modifications will offer themselves to those skilled in the art and are encompassed within the concept of the present invention. Thus, the plunger 8 and the spring 7 could be replaced with a different kind of valve capable of performing the same function, or such a valve could be provided intermediate the front or free end of the canula 4 and the injection membrane of the gas chromatographic apparatus—assuming, arguendo, that the present apparatus is to be used for injecting a liquid into a gas chromatographic apparatus—but care then must be taken that no dead space remains in this valve and the front or outlet end of the canula, because this could adversely influence the metering action.

It remains to be pointed out that with the apparatus according to the present invention, it is not only possible to obtain precise metering—and precisely reproducible metering—of liquids, but that the canulas themselves are so inexpensive to manufacture that they can be kept on hand in great quantities and that they are also easily and quickly cleanable simply by flushing them with water or any suitable agent.

It will be understood that each of the elements described above, or two or more together, may also find a useful application in other types of constructions differing from the types described above.

While the invention has been illustrated and described as embodied in an apparatus for precision metering of liquids, it is not intended to be limited to the details shown, since various modifications and structural changes may be made without departing in any way from the spirit of the present invention.

I claim:

1. Apparatus for precision metering of liquids, comprising a tubular member provided with an interior passage having opposite open ends and being of a predetermined volume, said interior passage when completely filled containing a predetermined quantity of liquid which is to be injected into a confined body of fluid medium which is at a predetermined pressure and which is in open communication with said passage at the time of injection; pressurizing means for ejecting the entire predetermined quantity of liquid from said passage; and normally closed valve means interposed between said pressuring means and said passage and operative for opening in a sense establishing communication between said passage and pressurizing means only when the pressure exerted by said pressuring means exceeds said predetermined pressure by a predetermined value.

2. Apparatus as defined in claim 1, said tubular member being a canula.

3. Apparatus as defined in claim 1, said passage being a capillary passage so as to become completely filled by capillary action in response to insertion of one of said open ends into a body of liquid.

4. Apparatus as defined in claim 1, said passage comprising two longitudinally adjacent communicating sections, one of which is a capillary so that said passage becomes completely filled by capillary action in response to insertion of one of said open ends into a body of liquid.

5. Apparatus as defined in claim 1, said tubular member comprising a first portion having a front end and a rear end, and a longitudinally adjacent second portion connected to and communicating with said first portion.

6. Apparatus as defined in claim 5, said tubular member having an interior bore including a first section in said first portion and a second section in said second portion and communicating with said first section, said second section constituting said passage, and wherein said passage is a capillary and becomes completely filled by capillary action on insertion of one of its open ends into a body of liquid.

7. Apparatus as defined in claim 5, further comprising connecting means releasably connecting said first portion and said second portion with one another.

8. Apparatus as defined in claim 5, further comprising coupling means releasably coupling said tubular member to said pressurizing means.

9. An apparatus for precision metering of liquids, comprising a tubular member provided with an interior passage having an open front end, an open rear end, and a predetermined volume so as to contain a predetermined quantity of liquid when filled; pressurizing means for ejecting the entire quantity of liquid from said passage under pressure, including a cylinder and a piston movable therein between an advanced pressure exerting position and a retracted suction position; cooperating coupling means on said cylinder and tubular member for releasably coupling the former to the latter, said coupling means on said cylinder including wall means defining a recess having an opening communicating with said rear end of said passage and further including a conduit communicating with said cylinder forwardly of the piston in the latter and having an aperture communicating with said recess; and normally closed valve means in said recess, including a biased plunger mounted rearwardly of said aperture for movement toward and away from said opening and normally sealingly engaging said rear end, said plunger being displaced away from said rear end in response to movement of said piston to said advanced position so that said valve means establishes communication between said passage and said pressurizing means only when the pressure exerted by the latter is greater by a predetermined value than the ambient pressure at said open front end.

10. Apparatus as defined in claim 9, said valve means comprising biasing means including a biasing spring exerting upon said plunger a force greater than said predetermined pressure but smaller than the pressure exerted by said pressurizing means.